PROCESS FOR FABRICATING AN ELECTROLUMINESCENT DISPLAY DEVICE

Filed Feb. 18, 1969 2 Sheets-Sheet 1

INVENTOR.
DONALD R. KERSTETTER
BY
ATTORNEY

PROCESS FOR FABRICATING AN ELECTROLUMINESCENT DISPLAY DEVICE

Filed Feb. 18, 1969 2 Sheets-Sheet 2

INVENTOR.
DONALD R. KERSTETTER
BY
Cyril A. Krenzer
ATTORNEY

United States Patent Office 3,564,680

Patented Feb. 23, 1971

3,564,680

PROCESS FOR FABRICATING AN ELECTROLUMINESCENT DISPLAY DEVICE

Donald R. Kerstetter, Emporium, Pa., assignor to Sylvania Electric Products Inc., a corporation of Delaware

Filed Feb. 18, 1969, Ser. No. 800,122
Int. Cl. H01j *9/00*
U.S. Cl. 29—25.14 9 Claims

ABSTRACT OF THE DISCLOSURE

An electroluminescent display device includes a substrate of ceramic material having a planar surface, a plurality of spaced electrical conductors embedded therein including spaced electrode segments affixed to the planar surface and electrically connected to at least one of the conductors extending in a direction normal to the planar surface, a layer of dielectric material affixed to the planar surface and electrode segments, a layer of phosphors affixed to the dielectric layer, and a transparent conductive layer affixed to the phosphor layer.

In one display device fabrication process, a plurality of spaced electrical connectors and at least one surface of the ceramic substrate material are placed in contacting relationship, confined within a mold, fired to embed the electrical conductors in the ceramic substrate material and form a substantially planar surface of ceramic substrate material. Then, the display structure including a plurality of spaced electrode segments forming a display configuration, a layer of dielectric material, a layer of phosphors, and a layer of transparent electrically conductive material is affixed to the planar surface of the ceramic substrate material.

BACKGROUND OF THE INVENTION

The prior art suggests numerous planar electroluminescent display devices wherein the device includes a transparent substrate of ceramic material such as glass, a transparent electrically conductive electrode affixed to the substrate, a phosphor-dielectric layer affixed to the transparent electrode, a plurality of electrically conductive segments forming a display affixed to the phosphor-dielectric layer, and a backplate covering the conductive segments. Normally, the backplate is of an electrical insulating material with a plurality of electrical conductors passing therethrough. Each of these conductors is aligned with and electrically connected to one of the conductive segments by any one of a number of well-known means and a preferred technique utilizes a resilient electrically conductive plug intermediate each of the segments and one of the conductors. Thus, the display configuration is viewed through the substrate with the electrical connections thereto extending through the backplate.

Normally, in the process of fabricating such electroluminescent devices, the transparent electrically conductive electrode, tin oxide for instance, is deposited onto the substrate, the phosphor-dielectric layer is deposited onto the transparent electrically conductive electrode, and a plurality of conductive electrode segments, normally aluminum, are affixed to the phosphor-dielectric layer. Also, electrical conductors are staked or in some manner affixed to and pass through the backplate of insulative material. Then, the electrical conductors are aligned and brought into contact with the conductive electrode segments and the backplate and the substrate sections are positionally fixed by some form of wax or epoxy seal intermediate the periphery of both the backplate and substrate.

Although such display devices and fabrication techniques have received widespread acceptance and contributed immeasurably to the display device art, it has been found that such structures and processes still leave something to be desired. For example, it has been found that structures wherein electrical conductors are staked into an insulator board, the display segments are affixed to a phosphor layer disposed on a substrate, and electrical connection of conductors and segments achieved by matching the conductors and segments present numerous difficulties with respect to reliability and dependability.

More specifically, it has been found that either the insulator board or the substrate have a tendency to warp whereupon electrical continuity between the conductors and segments is jeopardized if not completely lost. Also, the insulator board and substrate are often of different materials having different coefficients of linear expansion. Again, maintaining continuity between conductors and segments becomes an undesired problem. Moreover, the undesired problems of loss of continuity between conductors and segments is multiplied as structure size is reduced or miniaturization increases.

OBJECTS AND SUMMARY OF THE INVENTION

It is an object of this invention to provide an enhanced process for fabricating display devices. Another object of the invention is to provide an improved process for fabricating display devices of enhanced reliability and dependability. A further object of the invention is to enhance the fabrication of electroluminescent display devices by improving the uniformity and reliability of the electrical connections between conductors and electrode segments.

These and other objects, advantages and capabilities are achieved in one aspect of the invention by an electroluminescent display device having a ceramic substrate material with a substantially planar surface, a plurality of spaced electrode segments affixed to the surface and electrically connected to at least one of a plurality of spaced electrical conductors embedded in the ceramic substrate material, a dielectric layer affixed to the electrode segments and planar surface, a phosphor layer affixed to the dielectric layer, and a transparent electrically conductive layer forming an electrode affixed to the phosphor layer.

In the fabrication process, the spaced electrical conductors are placed in contacting relationship with at least one surface of a ceramic substrate material having a second surface substantially normal thereto, the conductors and ceramic substrate material are confined within a mold, fired to embed the conductor in the substrate material and form a substantially planar surface of substrate material whereon is disposed a display structure including a plurality of spaced electrode segments each of which is connected to at least one of the conductors, a dielectric layer, a phosphor layer, and a transparent electrically conductive layer forming an electrode.

DESCRIPTION OF THE PREFERRED EMBODIMENTS

For a better understanding of the present invention, together with other and further objects, advantages and capabilities thereof, the accompanying drawings and appended claims are to be considered in connection with the following disclosure.

Figures 1, 2, 3, 4, 5:
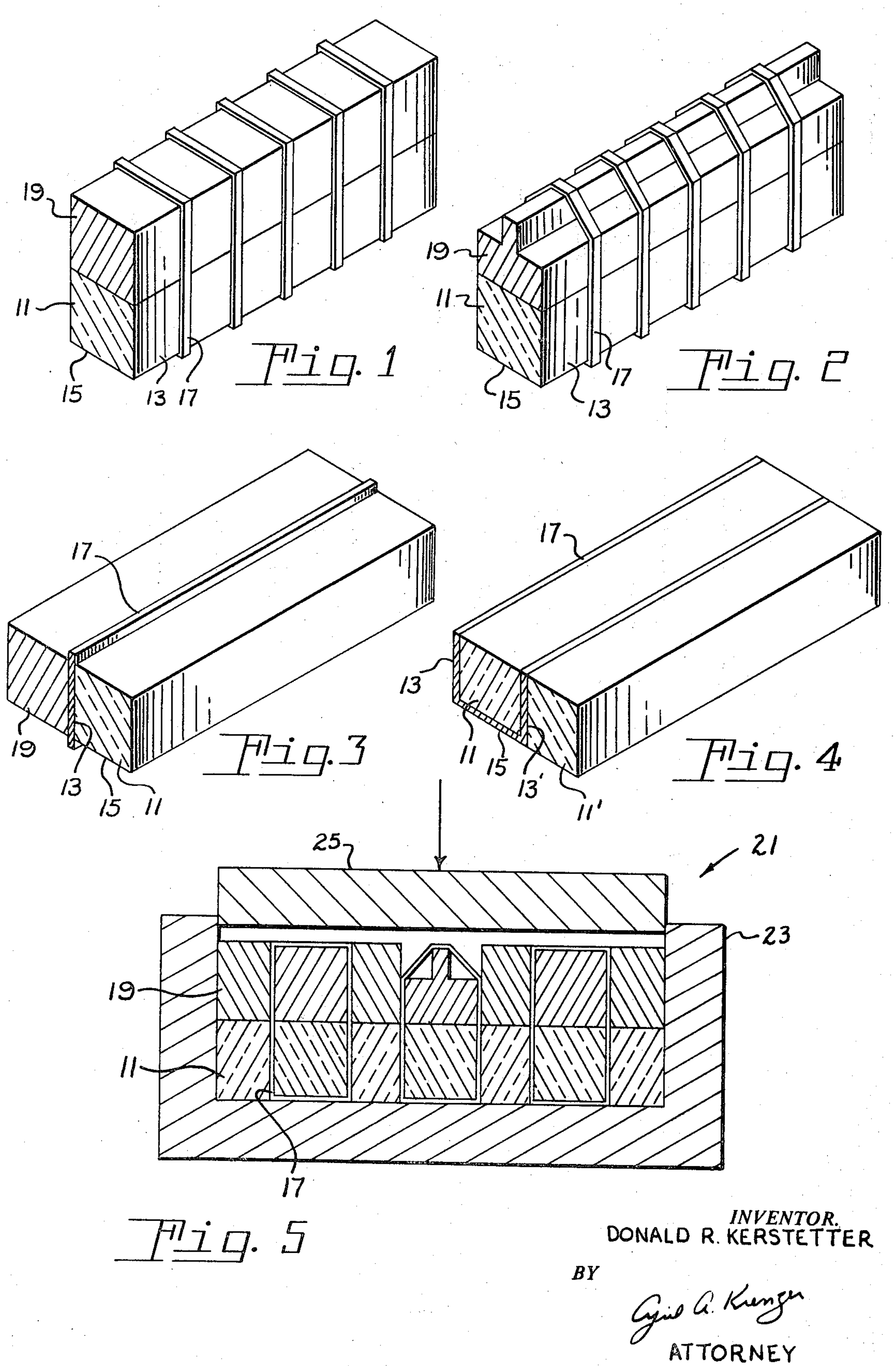
FIGS. 1–4 illustrate various techniques for establishing a contacting relationship between a plurality of spaced electrical conductors and at least one surface of a ceramic substrate material.
FIG. 5 illustrates one form of mold for confining the electrical conductors and substrate material.

Referring to the drawings, FIGS. 1–4 illustrate various embodiments of a ceramic substrate material 11 having at least one surface 13, a second surface 15 substantially normal thereto, and a plurality of spaced electrical conductors 17 in contacting relationship with at least the one surface 13. Also, the ceramic substrate material 11 and the spaced electrical conductors 17 are normally in contacting relationship with a graphite bar 19 as shown in FIG. 1 or an additional ceramic substrate material 11' as illustrated in FIG. 4.

More specifically, FIG. 1 illustrates a ceramic substrate material 11, glass for instance, in contact with a graphite bar 19. The substrate material 11 and graphite bar 19 are wound with wire or ribbon, in a manner well-known in the art, to provide a plurality of spaced electrical conductors 17 in contacting relationship with both the one surface 13 and the second surface 15 of the ceramic substrate material 11. Similarly, the embodiment of FIG. 2 includes a ceramic substrate material 11 having a first surface 13, a second surface 15 normal thereto and a plurality of spaced electrical conductor 17 in the form of wire or ribbon wound about the substrate material 11 and a graphite bar 19. In this instance, the graphite bar 19 is formed to facilitate severing of the electrical conductors 17.

FIG. 3 illustrates another embodiment for establishing a contacting relationship of electrical conductors and at least one surface of a ceramic substrate material. Herein, the spaced electrical conductors 17 are in the form of a metal strip having a plurality of apertures milled therein and these electriacl conductors 17 are disposed intermediate one surface 13 of a ceramic substrate material 11 and a graphite bar 19. In a somewhat similar manner, FIG. 4 illustrates an embodiment wherein the metal strip is milled to provide a plurality of spaced electrical conductors 17 and formed for contact with not only the one surface 13 of a ceramic substrate material 11 but also with a second surface 15. Moreover, the electrical conductors 17 are also in contact with the one surface 13' of the additional ceramic substrate material 11'.

As to the confining and firing, FIG. 5 illustrates a preferred technique. Therein, an assemblage of ceramic substrate materials 11, spaced electrical conductors 17, and graphite bars 19 are disposed within a graphite mold 21 having a substantially U-shaped portion 23. A weight 25 is placed on top of the assembly to insure compaction and pressing action upon both the ceramic substrate material 11 and the electrical conductors 17.

Thereafter, the graphite mold 21 containing the assemblage is fired for a time and at a temperature sufficient to cause embedment of the electrical conductors 17 in the ceramic substrate material 11 and the formation of a substantially planar surface of ceramic substrate material 11 formed from the plurality of individual components of the assemblage. In other words, the assemblage is fired such that the flow characteristics of the ceramic substrate material 11 is achieved whereupon the component parts of the assemblage flow together to provide a unitized planar surface.

After firing and the usual controlled cooling, the assemblage is removed from the mold 21 and the graphite bars 19 thereof are also removed. Thus, as shown in FIG. 6, there is provided a ceramic substrate material 27 having a substantially planar surface 29 with a plurality of spaced electrical conductors 31 embedded therein and extending therethrough in a direction substantially normal to the planar surface 29.

Moreover, it is to be noted that the spaced electrical conductors of this particular embodiment are in the form of an electrically interconnected integral unit which includes not only the electrical conductors 31 extending normal to the planar surface 29 but also the electrode segments 33 embedded therein. Obviously, utilizing an embodiment such as illustrated in FIG. 6 obviates the necessity of applying electrode segments 33 by a metal deposition or any one of a number of well-known techniques.

Figures 6, 7, 8, 9:
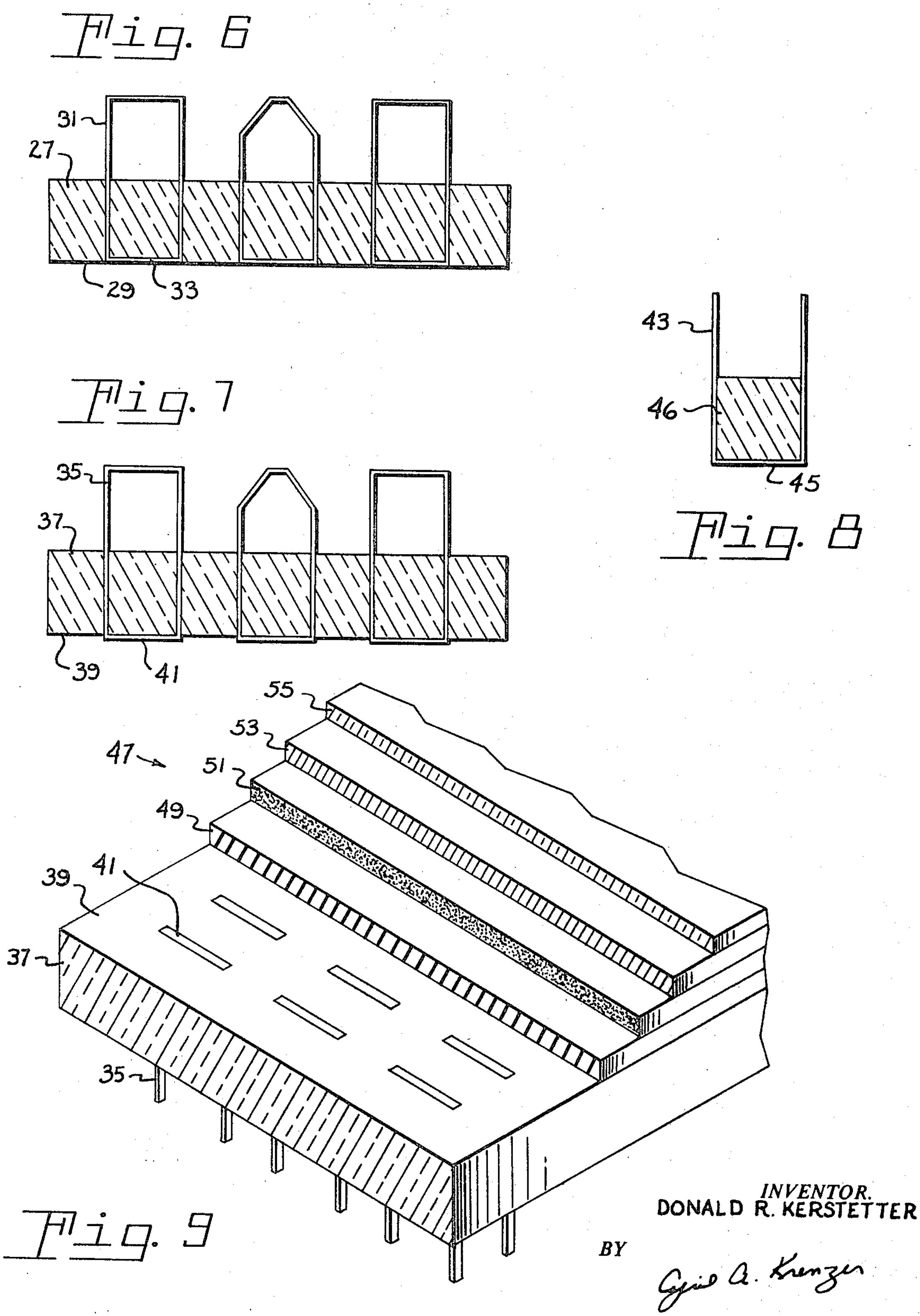
FIGS. 6–8 illustrate various embodiments showing the electrical conductors embedded into the ceramic substrate material as well as the electrically connected integral unit including both the conductor and segments.
FIG. 9 illustrates a preferred embodiment of a display device.

Alternatively, FIG. 7 illustrates an embodiment wherein a plurality of spaced electrical conductors 35 are embedded in and pass through the ceramic substrate material 37 in a direction substantially normal to a substantially planar surface 39 of ceramic substrate material 37. The electricl conductors 35 are at least flush with the planar surface 39 and a plurality of electrode segments 41 are deposited, as by an electrodeposition process for instance, onto the substantially planar surface 39 in electrical connection with at least one of the spaced electrical conductors 35. Also, FIG. 8 illustrates still another embodiment wherein the spaced electrical conductors 43 and electrode segments 45 are an integral unit embedded in the ceramic substrate material 46. Therein, the electrical conductors 43 are especially suitable for attachment by a spring-clip type of socket arrangement.

Thereafter, a display structure 47 is applied to provide a display device as illustrated by the embodiment of FIG. 9. The display device of FIG. 9 utilizes the embodiment of FIG. 7 wherein a plurality of spaced electrical conductors 35 are embedded in and pass through a ceramic substrate material 37 having a planar surface 39. Then, a plurality of electrode segments 41 are deposited onto the planar surface 39 with each of the segments 41 electrically connected to the end portion of at least one of the spaced electrical conductors 35.

Then, a layer 49 of dielectric material such as barium titanate is applied to the planar surface 39 and segments 41. The dielectric material layer 49 is overlayed with a layer 51 of phosphor materials such as copper-activated zinc sulfide and a transparent electrically conductive layer 53 is affixed to the phosphor layer 51 to provide an electrode. Obviously, the transparent conductive layer 53 can be applied in separate sections to provide a plurality of electrodes if desired.

Following, a protective cover 55 of transparent dielectric material such as glass is disposed upon the transparent conductive layer 53. The periphery of this protective cover 55 is bonded to the periphery of the ceramic substrate material 37 by wax, epoxy, or any one of a number of well-known techniques to provide a contained area intermediate the protective cover 55 and the ceramic substrate material 37.

As previously mentioned, the embodiment of FIG. 6 includes an integral electrically connected unit of spaced electrical conductors 31 embedded in and passing through the ceramic substrate material 27 as well as electrode segments 33 embedded in the planar surface 29 of the ceramic substrate material 27. In this instance, the layer 49 of dielectric material is applied to the planar surface 29 and electrode segments 33, overlayed with a phosphor layer 51, covered with a transparent conductive layer 53, and covered by a protective cover 55 whose periphery is sealed to the periphery of the substrate material 27 to provide a contained area.

Additionally, it should be noted that the spaced electrode segments are readily alterable prior to the application of the display structure 47. For instance, a single assemblage of spaced electrode segments may be readily divided into two separate groups by chemical milling or any one of a number of well-known techniques. As a result, an assemblage having spaced electrode segments with each end thereof electrically connected to a conductor can be divided to provide two assemblages with each spaced electrode segment having an electrical conductor connected thereto.

Thus, there has been provided a display device fabricated in accordance with a process providing advantages believe to be unavailable in any other known technique. For example, the process provides a display device of a size or configuration which is practically unlimited. By merely varying the size of the mold, almost any number and variation of ceramic substrate material portions and graphite bars may be deposited therein to provide a desired planar surface of ceramic substrate material, variations in the spaced electrode segments embedded in the planar surface, and innumerable variations in the electrical conductors connected to the segments and embedded in the ceramic substrate material.

Further, the density of the electrode segments is dependent upon the size thereof and limited only by the ability to maintain proper deposition and spacing therebetween. Also, the technique eliminates, for all practical purposes, problems of electrical connection and registration between electrical conductors and electrode segments. Moreover, the technique is relatively simple and inexpensive with respect to materials, time, and skill required.

While there have been shown and described what are at present considered the preferred embodiments of the invention, it will be obvious to those skilled in the art that various changes and modifications may be made therein without departing from the scope of the invention as defined by the appended claims.

I claim:

1. An electroluminescent display device fabricating process comprising the steps of:

contacting a plurality of spaced electrical conductors and at least one surface of a ceramic substrate material having a second surface substantially normal to said one surface;

confining said conductors and substrate material within a mold to cause development of pressure intermediate said conductors and at least said one surface of said substrate material;

firing said mold containing said contacting conductors and substrate material at a temperature and for a time sufficient to cause embedment of said conductors in said substrate material and the formation of a substantially planar surface normal to the surface having said conductors embedded therein; and applying a display structure to said substantially planar surface, said structure including a plurality of spaced electrode segments each electrically connected to at least one of said conductors, a layer of dielectric material overlaying said planar surface and segments, a layer of phosphor material overlaying said layer of dielectric material, and a transparent electrically conductive layer overlaying said layer of phosphors.

2. The process of claim 1 wherein said spaced electrical conductors and said spaced electrode segments of said display structure are an electrically connected integral unit with said conductors contacting said one surface of said ceramic substrate material and said segments contacting said second surface of said substrate material.

3. The process of claim 1 wherein said spaced electrical conductors are contacting at least one surface of at least two substrate materials.

4. The process of claim 1 wherein said spaced electrical conductors are disposed intermediate at least one surface of a ceramic substrate material and at least one surface of a graphite material.

5. The process of claim 1 wherein each of said spaced electrode segments is in the form of a metalized layer electrically connected to at least one of said conductors.

6. The process of claim 1 wherein said display structure includes a transparent cover of dielectric material in contact with said transparent electrically conductive layer with the peripheral surface of said transparent cover and substrate material bonded to provide confined area therebetween.

7. The process of claim 1 wherein said transparent electrically conductive layer of said display structure is in the form of a plurality of spaced sections forming a plurality of individually energizable display devices.

8. The process of claim 2 wherein said integral unit is in the form of a metal ribbon.

9. The process of claim 2 wherein said integral unit is in the form of a milled metal blank forming said spaced electrically connected conductors and segments.

References Cited

UNITED STATES PATENTS

| | | | |
|---|---|---|---|
| 2,698,915 | 1/1955 | Piper | 29—25.14X |
| 2,837,660 | 6/1958 | Orthuber | 313—108AX |
| 3,147,534 | 9/1964 | Howell | 29—25.17 |
| 3,325,664 | 6/1967 | Buck | 313—108A |
| 3,339,075 | 8/1967 | Szepesi | 313—108AX |
| 3,348,456 | 10/1967 | Kohashi | 313—108AX |

JOHN F. CAMPBELL, Primary Examiner

R. B. LAZARUS, Assistant Examiner

U.S. Cl. X.R.

29—25.13, 25.17